(12) United States Patent
Torres (10) Patent No.: US 12,151,177 B1
(45) Date of Patent: Nov. 26, 2024

(54) SPINNING TOP FOR DEMONSTRATING AND TEACHING STEM CONCEPTS

(71) Applicant: Jorge Luis Torres, Tamarac, FL (US)

(72) Inventor: Jorge Luis Torres, Tamarac, FL (US)

( * ) Notice: Subject to any disclaimer, the term of this patent is extended or adjusted under 35 U.S.C. 154(b) by 48 days.

(21) Appl. No.: 17/734,637

(22) Filed: May 2, 2022

Related U.S. Application Data (60) Provisional application No. 63/183,031, filed on May 2, 2021.

(51) Int. Cl.
*A63H 1/00* (2019.01)
*G09B 23/02* (2006.01)
*G09B 23/06* (2006.01)

(52) U.S. Cl.
CPC .............. *A63H 1/00* (2013.01); *G09B 23/02* (2013.01); *G09B 23/06* (2013.01)

(58) Field of Classification Search
CPC .................................... A63H 1/00; A63H 1/22
See application file for complete search history.

(56) References Cited

U.S. PATENT DOCUMENTS

| | | | | |
|---|---|---|---|---|
| 537,887 A | * | 4/1895 | Bradley | A63H 1/22 273/147 |
| 1,267,558 A | * | 5/1918 | Komorous | A63H 1/00 446/256 |
| 1,609,336 A | * | 12/1926 | Ward | A63H 1/00 446/262 |
| 10,099,151 B2 | * | 10/2018 | Liang | A63H 1/00 |
| 10,486,457 B1 | * | 11/2019 | Oas | B43K 23/06 |
| 2004/0077271 A1 | * | 4/2004 | Schaer | A63H 1/00 446/236 |
| 2005/0009437 A1 | * | 1/2005 | Hendron | A63H 1/00 446/85 |

* cited by examiner

*Primary Examiner* — John A Ricci (57) ABSTRACT

The present invention is an improvement on the spinning top that includes a plurality of radial indentations, notches, or holes along the outer circumference. It also includes a sloped, geometrically shaped stem, topped with a rounded gear used to spin the top. A plurality of square-holed inserts which lock in place when inserted over the sloped, square stem, are also provided for demonstrating STEM concepts. The indentations, when spinning, highlight the effect of AC electric light by creating a strobing effect that appears at first to move with the rotation of the top, then appears to stand still, and then reverses rotation. The interchangeable parts or spokes make it possible for the invention to have variable geometry that allows the invention's mass, balance, and weight distribution to be modified. The invention's indentations, interchangeable spokes, and graphical locking inserts can be used individually or in unison to demonstrate and teach various STEM concepts. The invention can also be used for entertainment and to produce interesting visual and sound effects.

19 Claims, 7 Drawing Sheets

SPINNING TOP FOR DEMONSTRATING AND TEACHING STEM CONCEPTS

CROSS-REFERENCE TO RELATED APPLICATIONS

This application claims the benefit of U.S. Provisional Patent Application No. 63/183,031, filed on May 2, 2021, which is incorporated by reference herein in its entirety.

FIELD OF THE INVENTION

The present invention relates generally to toy apparatuses. More particularly, the present invention relates generally to a novel improvement on the spinning top that uses a plurality of radial indentations, interchangeable spokes, and graphical locking inserts to demonstrate and teach STEM (Science, Technology, Engineering, and Math) concepts.

BACKGROUND OF THE INVENTION

Spinning tops have a long and storied history. Often among the oldest recognizable toys found on archaeological sites, spinning tops originated independently in cultures all over the world. One of earliest examples of spinning tops were discovered in Iraq dating back to the 35th century BC and were likely fabricated from maple seeds and impaled fruit. As time evolved, other products were used to fabricate spinning tops, including wood and various metals.

The spinning top continues to be popular throughout the world and has undergone continued development. While primarily still used as toys, modern spinning tops have also attracted adults. Some tops are made of fine materials and crafted to exacting tolerances that make them perform as good as they look. And innovations such as nesting, launchers, battle modes, levitation with magnets, etc. have created a new generation of spinning tops.

Meanwhile, humanity continues to adopt modern electronic technology at an exponential rate. Smart phones and computers are ubiquitous, making the entire knowledge base of mankind available instantly on these devices. Naturally, the educational establishment has also incorporated these technologies with much success but also with some caveats.

As studies continue to show the damaging effects of electronic display screens on the very young, a need has arisen for screen-less, non-electronic devices and methods for teaching young children. The term "screen time" has now become a negative metric for children and one that many parents constantly strive to reduce or even eliminate. Devices that offer educational value without the use of electronic screens are in high demand by these parents, especially if these devices promote STEM concepts.

Accordingly, there remains a need in the art for a solution to at least one of the aforementioned problems. For instance, a non-electronic device that offers educational value to young children is desired. Electronic devices are a strong lure for young children; consequently, any non-electronic device or method presented to the young child as an alternative must also be attractive to them. Therefore, combining fun, popular, non-electronic toys, such as spinning tops, with STEM lessons is an innovative way of providing science, technology, engineering, and math education to young minds without the use of harmful electronic screens.

SUMMARY OF THE INVENTION

The present invention is directed to a spinning top. The spinning top includes a planar body having a top surface and a bottom, wherein a stem protrudes from the top surface of the planar body and a conical base protrudes from the bottom surface of the planar body. The planar body may be comprised of a plurality of spokes which may be removed by the user. The stem may include a base affixed to the top surface of the planar body, wherein the base may serve as a locking mechanism for a graphical insert. The conical base may include a base tip defining a vertical axis of rotation that is symmetrical about the top, when the top is in use.

The spinning top may provide a number of benefits in teaching and demonstrating and teaching STEM concepts. Firstly, the use of radial indentations, interchangeable spokes, and graphical locking insert within the planar body of the spinning top provide a user experience unlike conventional spinning tops. These can be used individually or in unison to demonstrate and teach a variety of STEM lessons, especially math and science concepts, many of which are based on the interaction of the ambient light with the rotating indentations and graphical locking insert markings that show the effects of the 60 Hertz (Hz) cycle of alternating current (AC) electricity. Secondly, the removable and interchangeable spokes that connect to a base within the stem of the planar body helps to create variable geometry and allow the device's mass, balance, weight distribution, and indentations to be modified. Lastly, alternate embodiments are envisioned in which framed spokes are utilized such that users can modulate the design of the spinning top.

In a first implementation of the invention, a spinning top comprises:
  a planar body having a top surface and a bottom surface;
  a stem protruding from the top surface of the planar body, the stem including a base affixed directly to the top surface of the planar body, wherein the base is configured to hold a locking insert in place on the top surface of the planar body; and
  a conical base protruding from the bottom surface of the planar body, the conical base including a base tip;
  wherein the base tip defines a vertical axis of rotation symmetrical about the stem.

In a second aspect, the planar body may include a side surface connecting the top surface to the bottom surface.

In another aspect, the side surface may include a plurality of indentations along the side surface of the planar body, the plurality of indentations being equal and symmetrical in size along the side surface.

In another aspect, the plurality of indentations may be rounded in shape.

In another aspect, the planar body may be comprised of a plurality of interchangeable spokes.

In another aspect, the interchangeable spokes may include an inner side surface, the inner side surface including a magnetic hub connector.

In another aspect, the magnetic hub connector of the interchangeable spokes may be configured to mate with a magnetic spoke hub of a top core portion of the spinning top.

In another aspect, the top core portion may include the stem and the conical base.

In another aspect, the stem may include a stem tip, a stem gear, the base, and a sloped portion connecting the base to the stem gear and the stem tip.

In another aspect, the base may be square-shaped.

In another aspect, the stem gear may include a plurality of radial protrusions disposed circumferentially about a longitudinal axis.

In another aspect, the radial protrusions may be configured to allow a user to better grip the stem gear.

In another aspect, the locking inserts may include graphical imprints.

In another aspect, the locking inserts may include a geometrically shaped hole, wherein the geometrically shaped hole is configured to match the sloped portion of the stem such that the locking insert may lock in place on the top surface of the planar body.

In another implementation of the invention, a method of using the spinning top comprises:
  obtaining a spinning top having a planar body having a top surface and a bottom surface, a stem protruding from the top surface of the planar body, the stem including a base affixed directly to the top surface of the planar body, wherein the base is configured to hold a locking insert in place on the top surface of the planar body, and a conical base protruding from the bottom surface of the planar body, the conical base including a base tip;
  positioning the thumb and the index finger of a user about the stem; and
  rotating the stem in either a clockwise or counter-clockwise direction.

In another aspect, the planar body may be comprised of a plurality of spokes, wherein a user may remove at least one of the plurality of spokes prior to spinning.

In another aspect, a user may affix a locking insert to the top surface of the planar body through the stem.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
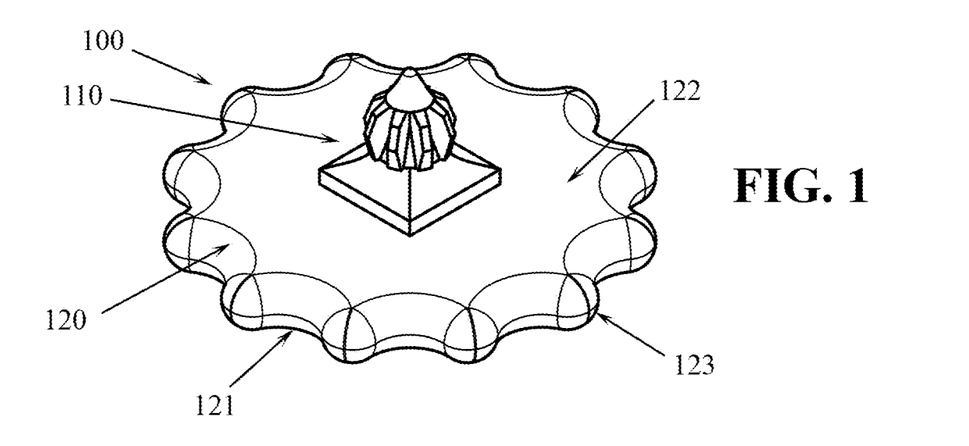
FIG. 1 presents a top perspective view of the spinning top for demonstrating and teaching STEM concepts in accordance with a first illustrative embodiment of the invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a spinning top for demonstrating and teaching various STEM concepts. The apparatus may include a planar body with an attached stem and an attached conical base and base tip on opposite sides of the planar base. As will be described in greater detail hereinafter, in some embodiments the planar body may be comprised of a singular unit, whereas in other embodiments the planar base may be comprised of a plurality of interchangeable spokes. The aforementioned stem may include a rotatable stem gear, as well as a stem base. The stem base may serve as a locking mechanism for a locking insert on a top surface of the planar body. The design of the spinning may be configured such that the base tip defines a vertical axis of rotation symmetrical about the apparatus.

Referring initially to FIGS. 1-5, a spinning top 100 for demonstrating and teaching STEM concepts is illustrated in accordance with a first embodiment of the present invention. The spinning top 100 includes a planar body 120 having a top surface 122 and a bottom surface 124. Additionally, the planar body 120 may include a side surface 123 connecting the top surface 122 to the bottom surface 124. The side surface 123 may include a plurality of indentations 121 that may be radial in nature and may run along the side surface 123 of the planar body 120. Each of the plurality of indentations 121 may be equal in size and may be symmetrical along the side surface. As shown in the present embodiment, the plurality of indentations 121 may be rounded in shape. However, embodiments are envisioned wherein the shape and structure on the plurality of indentations 121 may vary. Similarly, in the present embodiment the planar body 120 less than the plurality of indentations 121 may be circular in shape. However, embodiments are envisioned wherein the planar body 120 may be comprised of any symmetrical shape allowing the base tip 131 to define a vertical axis of rotation about the stem 110.

Figure 2:
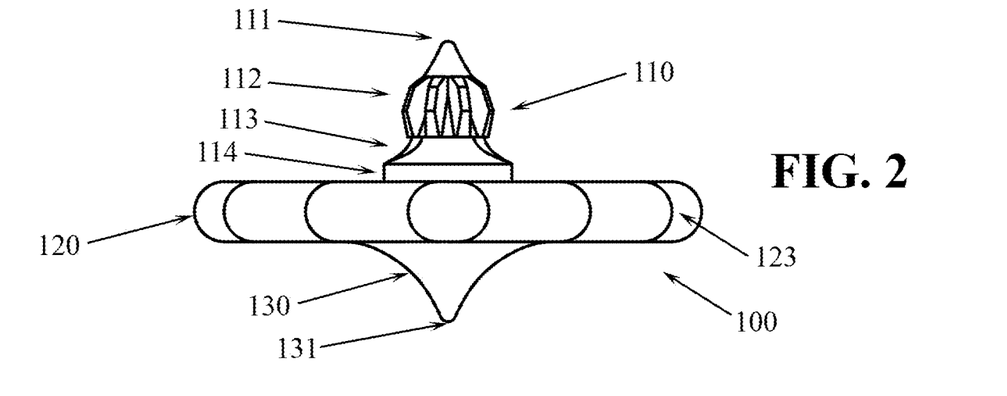
FIG. 2 presents a side elevation view of the spinning top illustrated in FIG. 1.
Figure 4:
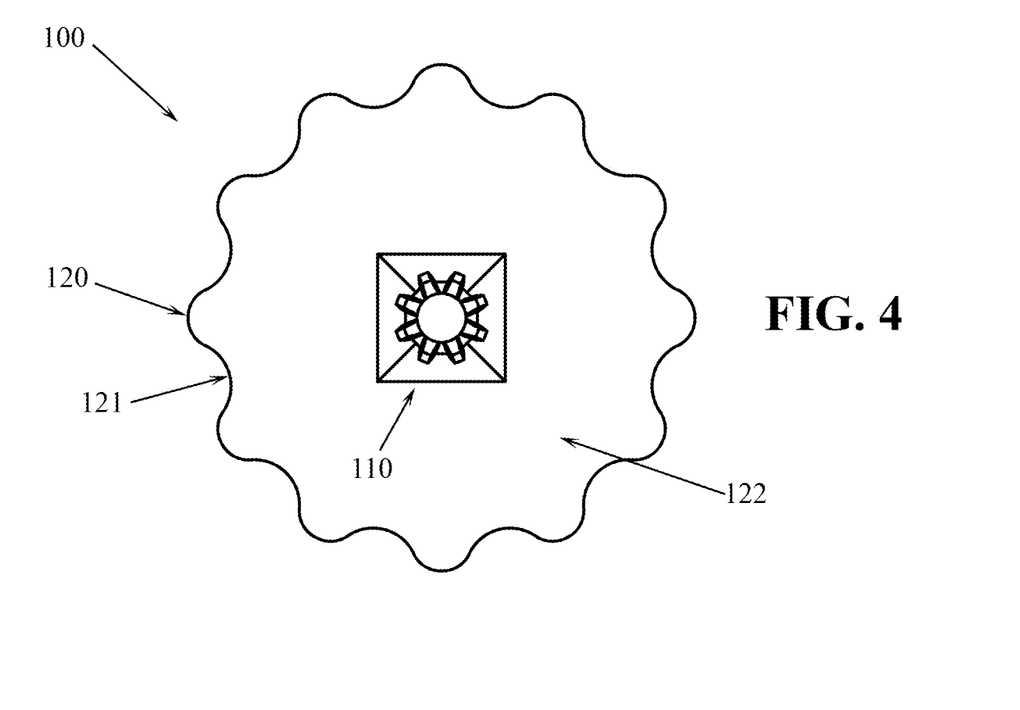
FIG. 4 presents a top plan view of the spinning top illustrated in FIG. 1.
Figure 5:
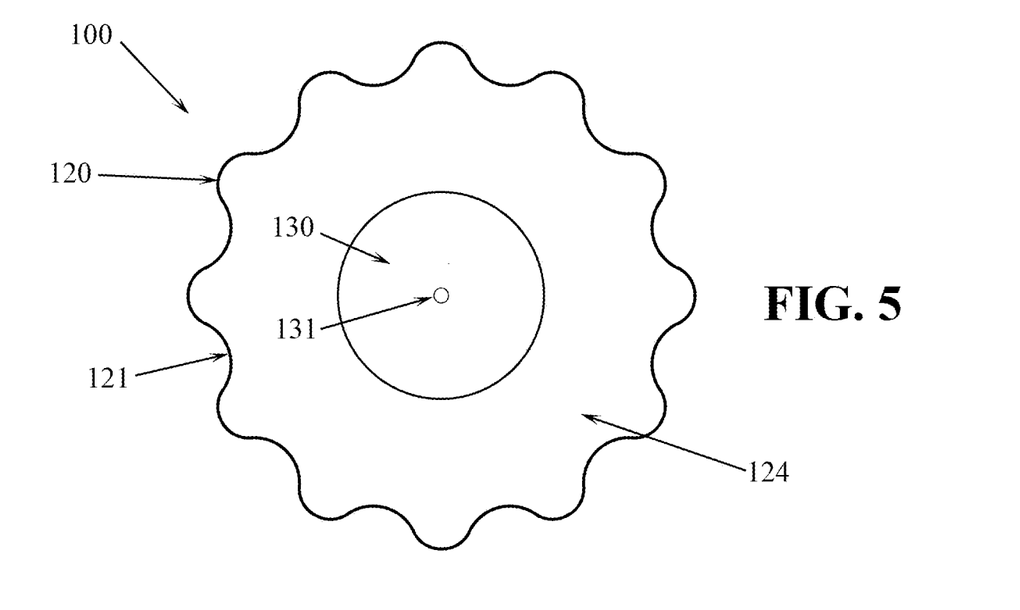
FIG. 5 presents a bottom plan view of the illustrated in FIG. 1.
Figure 6:
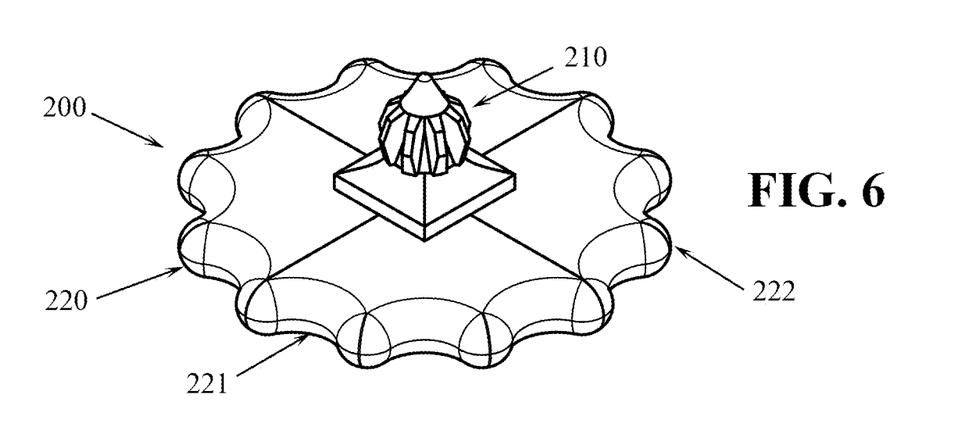
FIG. 6 presents a top perspective view of a spinning top for demonstrating and teaching STEM concepts in accordance with another illustrative embodiment of the invention.
Figure 7:
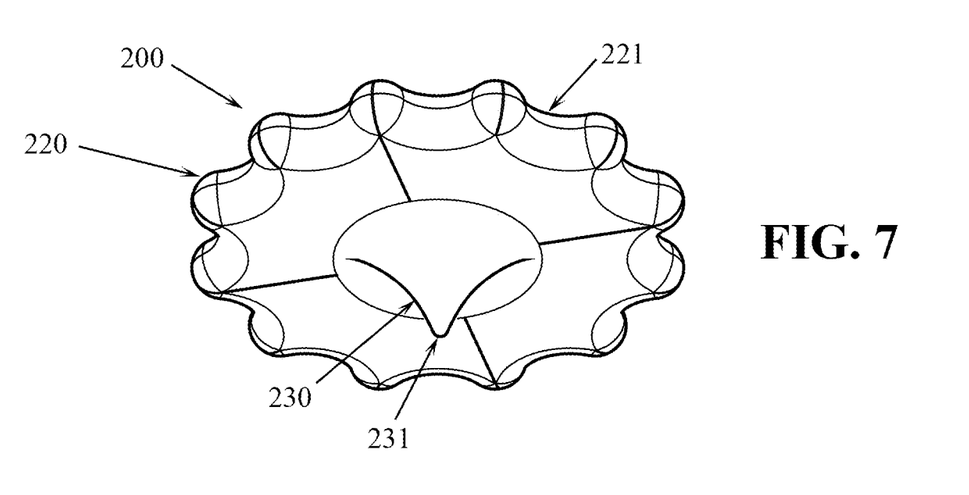
FIG. 7 presents a bottom perspective view of the spinning top illustrated in FIG. 6.

With specific reference to FIG. 2, the stem 110 may protrude from the top surface 122 of the planar body 120. In particular, the stem 110 may include a base 114 affixed to the to the top surface. In addition to the base 114, the stem 110 may also include a stem tip 111, a stem gear 112, and a sloped portion 113. The sloped portion 113 may connect the base 114 to the stem gear 112. The base 114 may be square-shaped and may be configured to hold a locking insert (as will be described in greater detail hereinafter) in place on the top surface 122 of the planar body 120. The sloped portion 113 may connect the stem gear 112 to the base 114. The stem gear 112 may include a plurality of radial protrusions disposed circumferentially about a longitudinal axis. This is also shown in FIG. 4. The plurality of radial protrusions may be configured to allow a user to better grip the stem gear 112.

Figure 3:
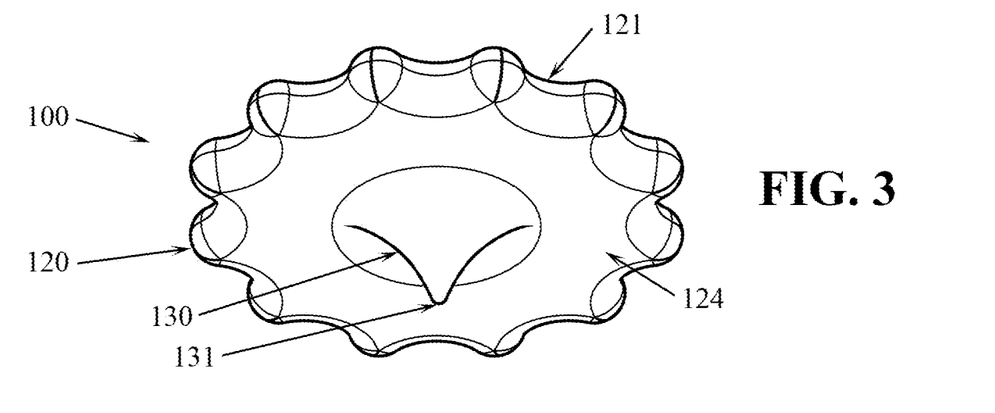
FIG. 3 presents a bottom perspective view of the spinning top illustrated in FIG. 1.

Referring now particularly to FIG. 3, protruding from the bottom surface of the planar body 120 may be a conical base 130. The conical base 130 may be located in a center portion of the bottom surface of the planar body. At an apex of the conical base 130 may be the base tip 131. The base tip 131 may be configured to contact with a surface and rotate on that surface, allowing the spinning top 131 to spin in the direction desired by the user.

Figure 15:
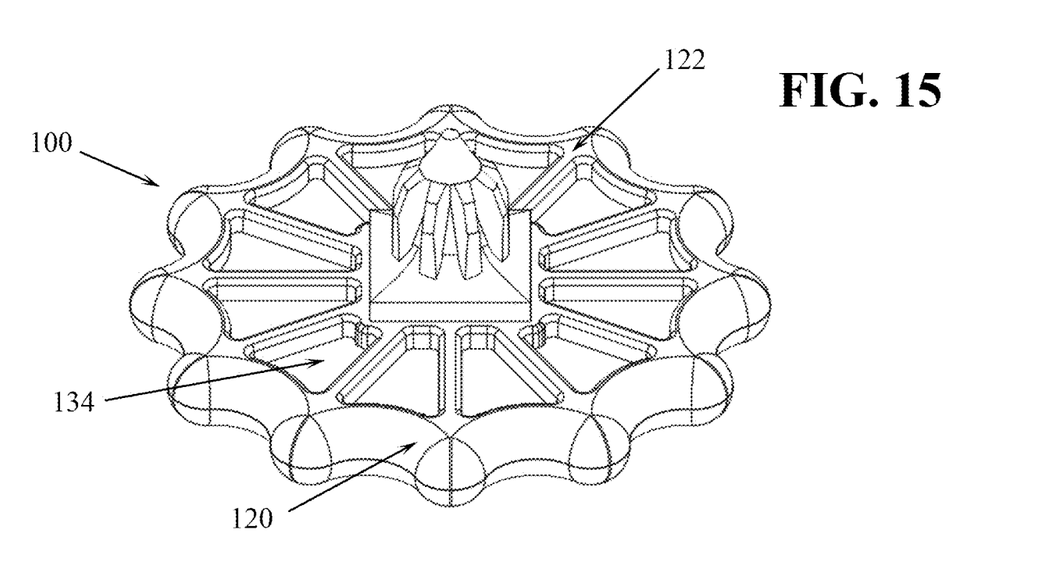
FIG. 15 presents a top perspective view of a spinning top for demonstrating and teaching STEM concepts in accordance with another illustrative embodiment of the invention.

As best shown in FIG. 15, the spinning top 100 may include a plurality of radial impressions 134. The plurality of radial impressions 134 may run directly through the top surface 122 and the bottom surface 124 of the planar body 120.

Figure 8:
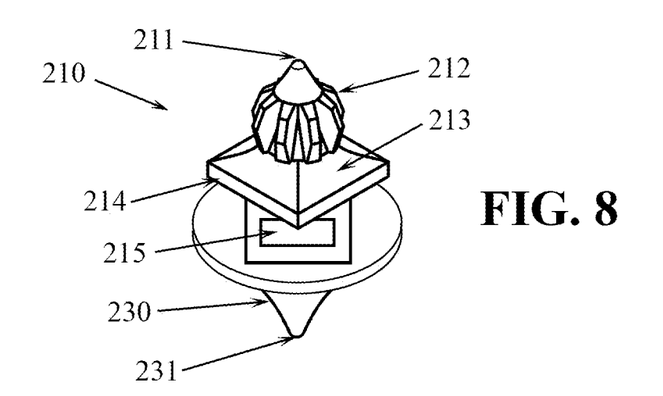
FIG. 8 presents a perspective view of a top core portion of the spinning top illustrated in FIG. 6.
Figure 9:
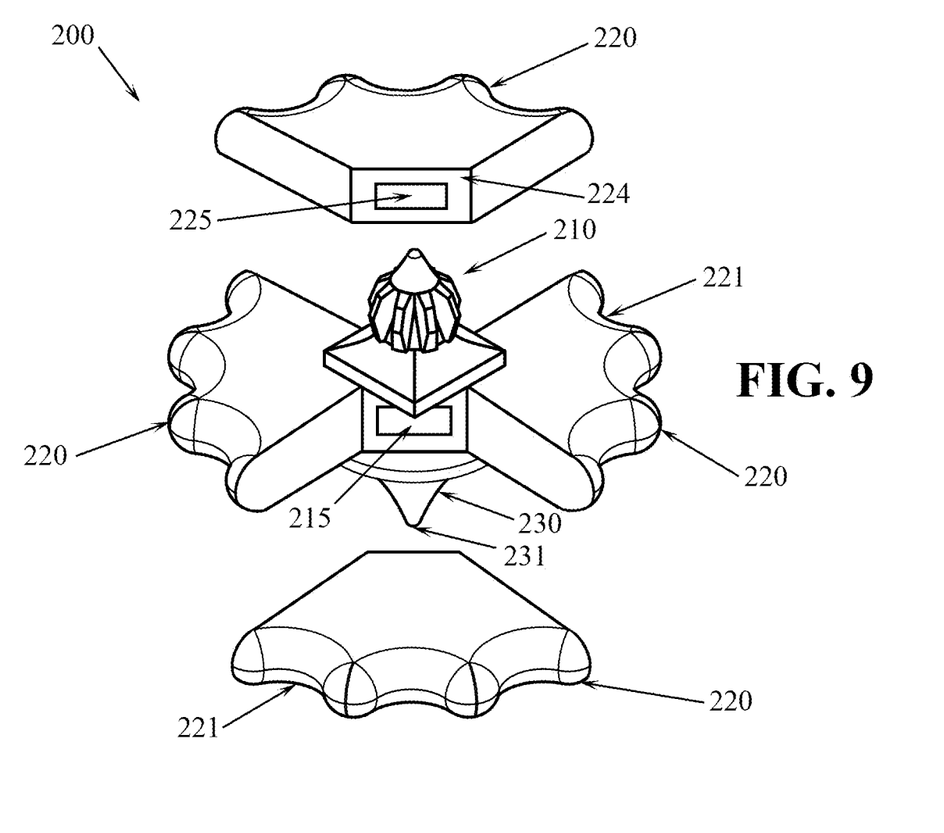
FIG. 9 presents an exploded, perspective view of a partially disassembled spinning top illustrated in FIG. 6.

Referring now to FIGS. 6-9, a spinning top 200 for demonstrating and teaching STEM concepts is illustrated in accordance with a second embodiment of the present invention. The spinning top 200 includes a planar body 218 comprised of a plurality of interchangeable spokes 220. As best shown in FIG. 9, the plurality of interchangeable spokes 220 may include an outer side surface 222 and an inner side surface 224. The outer side surface 222 may include a plurality of indentations 221 that may be radial in nature, similar to the first embodiment. Each of the plurality of indentations 221 may be equal in size and may be symmetrical along the outer side surface 222. As shown in the present embodiment, the plurality of indentations 221 may be rounded in shape. However, embodiments are envisioned wherein the shape and structure on the plurality of indentations 221 may vary. The inner side surface 224 of interchangeable spokes 220 may include a magnetic hub connector 225. The magnetic hub connector 225 may be configured to mate with a magnetic spoke hub 215 of a top core portion 210 of the spinning top 200.

With particular reference to FIG. 8-9, the top core portion 210 includes a stem tip 211, a stem gear 212, a sloped portion 213 connection the stem gear 212 to a base 214, a magnetic spoke hub 215, a conical base 230, and a base tip 231. The conical base 230 may include a circular platform 232 before protruding out to the base tip 231. As mentioned previously, the magnetic spoke hub 215 may connect each of the plurality of interchangeable spokes 220 to the top core portion 210 to form the spinning top 200.

Figure 10:
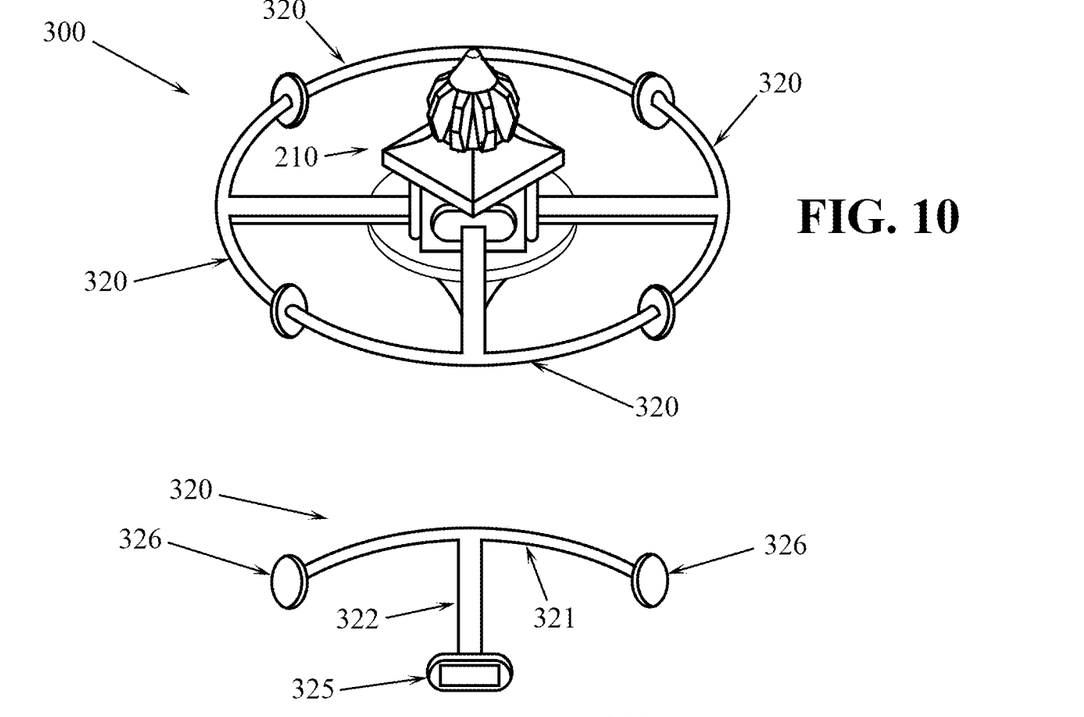
FIG. 10 presents a top perspective view of a spinning top for demonstrating and teaching STEM concepts in accordance with another illustrative embodiment of the invention.
Figure 11:
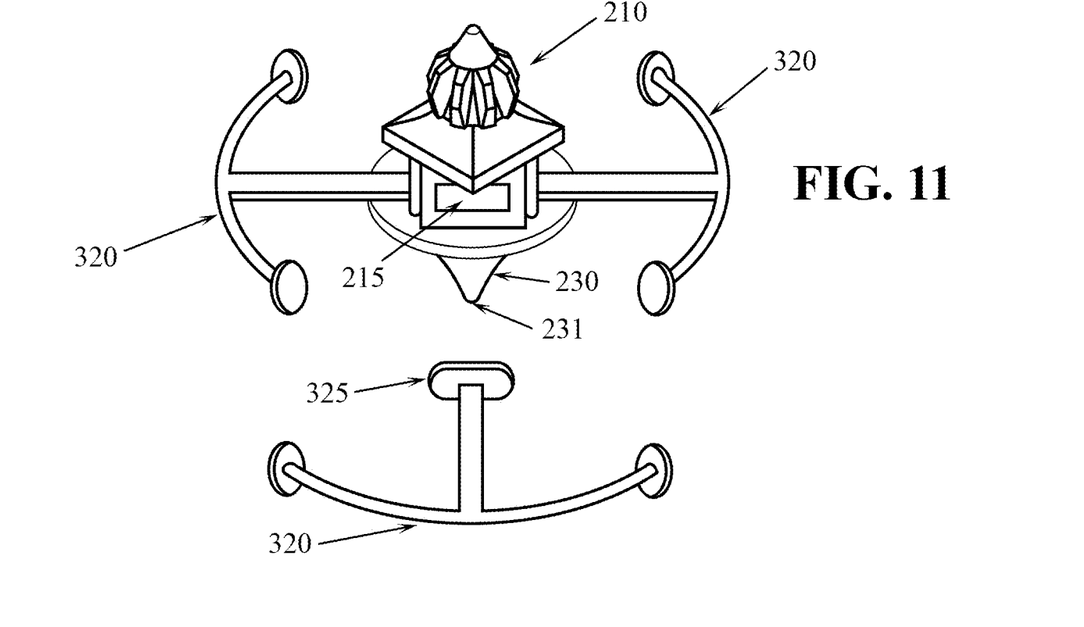
FIG. 11 presents an exploded, perspective view of a partially disassembled spinning top illustrated in FIG. 10.

Referring to FIGS. 10 and 11, in a third embodiment of the invention, the spinning top 300 similar to the aforementioned spinning top 200, it is also composed of interchangeable parts: one top core portion 210 and a plurality of frame spokes 320. Instead of having indentations, the frame spoke 320 is comprised of a circular frame 321 and spoke 322, a magnetic hub connector 325 at the end of the spoke, and magnetic frame connectors 326 at each end of the circular frame. When the frame spoke 320 is inserted into the magnetic spoke hub 215 of the top core 210, the parts snap together forming a secure fit with the magnetic hub connector 325 attaching to the magnetic spoke hub 215 and the magnetic frame connectors 326 attaching to the adjacent magnetic frame connectors, if present. The top core 210 can be used with all four frame spokes 320 at the same time or any combination thereof.

Figure 12:
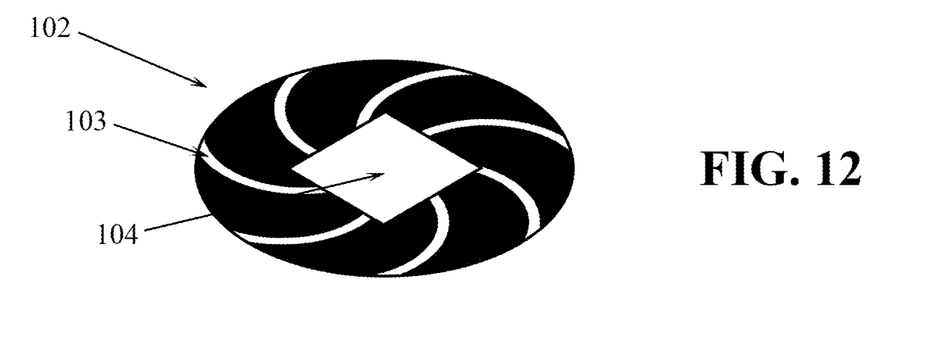
FIG. 12 presents a perspective view of a graphical locking insert.
Figure 13:
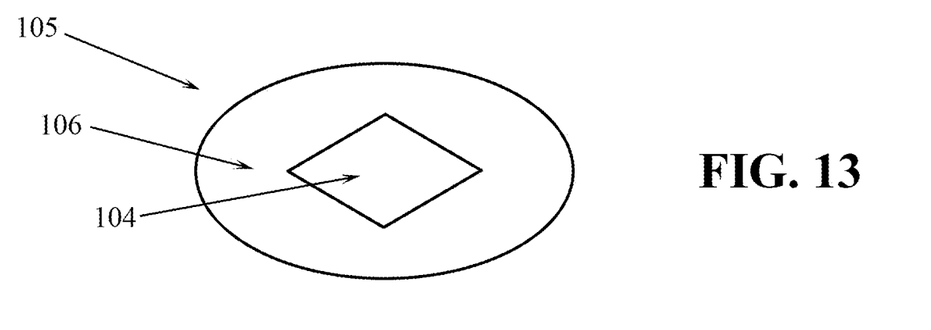
FIG. 13 presents a perspective view of a blank locking insert.
Figure 14:
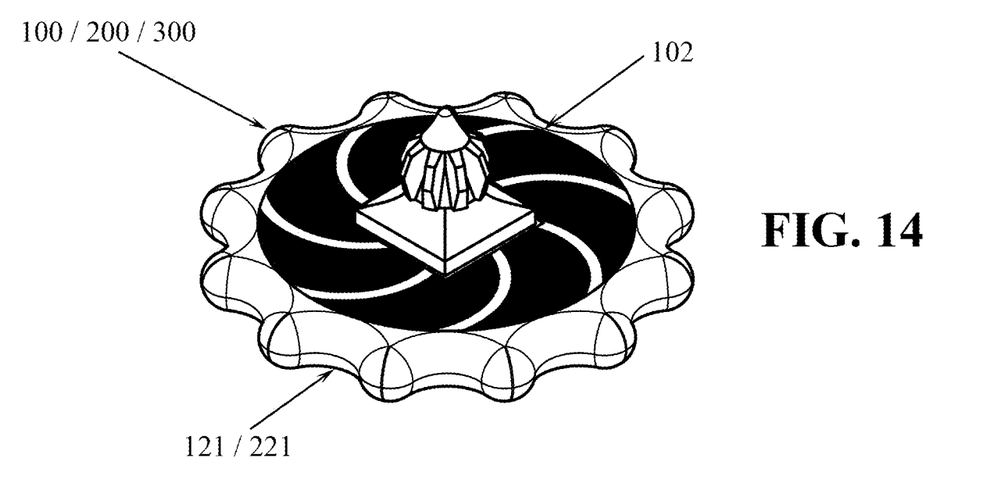
FIG. 14 presents a top perspective view of the spinning top illustrated in FIG. 1, shown with a graphical insert in place on a top surface of the spinning top.

Referring to FIGS. 12-14, in another aspect of the invention, locking inserts 102 are provided that may enhance the effect produced by alternating current electric light, and also provide the basis for additional STEM lessons. FIG. 12 shows a circular graphical locking insert 102 with a graphical design 103 and a square opening 104 that locks in place when inserted over the top of the stem gear 112 and base 114, as shown in FIG. 14. The lock enabled by the base may prevent the square-holed insert from rotating when the top is motion. The stem 110 and the hole in the inserts can be any geometric shape that allows the insert to lock in place when placed over the stem.

As shown in FIG. 13, a blank locking insert 102 with a blank surface 106 and a square opening 104 that locks in place when inserted over the top of the gear and base. Blank locking inserts 105 are used by students to create and experiment with their own graphical designs and patterns.

With reference to FIGS. 1-14, an example method of operation of the spinning top 100, 200, 300 is demonstrated. Launching the device is generally accomplished by using the thumb and index finger to spin the top using the top stem 110 (or top core portion 210) and the stem gear 112, 212.

If the spinning top 100, 200, 300 is spun clockwise under an AC electric light without a graphical locking insert, the indentations on the outer circumference will interact with and synchronize with AC electric light in the following way: when the rotational speed of the top 100, 200, 300 is well outside of the 60 Hz sync speed, the plurality of indentations 121, 221 appear as a fast rotating blur. As the rotational speed of the top 100, 200, 300 approaches the 60 Hz sync speed, a strobed image of the indentations 121, 221 appears rotating clockwise. Rotation may then slow and appear to stop and then the rotation reverses. As the rotational speed of the top falls below the 60 Hz sync speed, the strobed image of the indentations 121, 221 continues rotating counter-clockwise with increasing speed until it becomes a blur again. However, the spinning top 100, 200, 300 is spinning clockwise.

If the spinning top 100, 200, 300 is spun clockwise with a graphical locking insert 102 in place, under AC electric light, the indentations 121, 221 on the side surface will behave in the way described above. Similarly, this effect may be demonstrated in the plurality of radial impressions 134 at that speed. The graphical locking inserts can be used to show how the onset of the AC electric light effect varies depending on the number indentations or spokes being rotated under that light. For example, if an embodiment where the invention has twelve indentations and a graphical locking insert that has eight spokes is used, the AC electric light effect will appear sooner on the spokes of the insert than on the outer indentations.

Alternative embodiments are contemplated to those shown or described herein without departing from the scope of the present disclosure. For example, embodiments are contemplated in which the number of the plurality of spokes vary. Another alternative embodiment considered differentiating the shapes of both the indentations, as well as the shapes of the stem and the inserts.

In summary, the spinning top disclosed herein provides a user with a spinning top that allows a user to create variable geometry and allow the device's mass, balance, weight distribution, and indentations to vary. This variability allows for the demonstration and teaching of various STEM concepts.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A spinning top comprising:
    a planar body having a top surface and a bottom surface, the planar body including a plurality of radial impressions running through the top surface and the bottom surface of the planar body;
    a stem protruding from the top surface of the planar body, the stem including a base affixed directly to the top surface of the planar body, wherein the base is configured to hold a locking insert in place on the top surface of the planar body; and
    a conical base protruding from the bottom surface of the planar body, the conical base including a base tip;
    wherein the base tip defines a vertical axis of rotation symmetrical about the stem.

2. The spinning top of claim 1, wherein the planar body includes a side surface connecting the top surface to the bottom surface.

3. The spinning top of claim 2, wherein the side surface includes a plurality of indentations, the plurality of indentations being equal and symmetrical in size along the side surface.

4. The spinning top of claim 3, wherein the plurality of indentations are rounded in shape.

5. The spinning top of claim 1, wherein the planar body is comprised of a plurality of interchangeable spokes.

6. The spinning top of claim 5, wherein the plurality of interchangeable spokes each include an inner side surface, the inner side surface including a magnetic hub connector.

7. The spinning top of claim 6, wherein the magnetic hub connector of each of the plurality of interchangeable spokes are configured to mate with a magnetic spoke hub of a top core portion of the spinning top.

8. The spinning top of claim 7, wherein the top core portion includes the stem and the conical base.

9. The spinning top of claim 8, wherein the stem includes a stem tip, a stem gear, the base, and a sloped portion connecting the base to the stem gear and the stem tip.

10. The spinning top of claim 9, wherein the stem gear includes a plurality of radial protrusions disposed circumferentially about a longitudinal axis.

11. The spinning top of claim 10, wherein the radial protrusions are configured to allow a user to better grip the stem gear.

12. The spinning top of claim 9, wherein the locking inserts include a geometrically shaped hole, and further wherein the geometrically shaped hole is configured to match the sloped portion of the stem such that the locking insert locks in place on the top surface of the planar body.

13. The spinning top of claim 1, wherein the base is square-shaped.

14. The spinning top of claim 1, wherein the locking inserts may include graphical imprints.

15. The spinning top of claim 1, wherein the locking inserts are blank such that a user creates and experiment with their own graphical designs and patterns.

16. A spinning top comprising:
    a planar body having a top surface and a bottom surface, the planar body including a side surface connecting the top surface to the bottom surface, wherein the side surface includes a plurality of indentations, the plurality of indentations being equal and symmetrical in size along the side surface;
    a stem protruding from the top surface of the planar body, the stem including a base affixed directly to the top surface of the planar body, wherein the base is configured to hold a locking insert in place on the top surface of the planar body; and
    a conical base protruding from the bottom surface of the planar body, the conical base including a base tip;
    wherein the base tip defines a vertical axis of rotation symmetrical about the stem, and further wherein the planar body is in rotation greater than 60 Hz and under AC electric light, the indentations appear as a fast rotating blur.

17. The spinning top of claim 16, wherein the stem gear includes a plurality of radial protrusions disposed circumferentially about a longitudinal axis, and further wherein the plurality of radial protrusions are configured to allow a user to better grip the stem gear.

18. A spinning top comprising:
    a planar body having a top surface and a bottom surface, the planar body including a side surface connecting the top surface to the bottom surface, wherein the side surface includes a plurality of indentations, the plurality of indentations being equal and symmetrical in size along the side surface;
    a plurality of interchangeable spokes comprised within the planar body, the plurality of interchangeable spokes including an inner side surface, the inner side surface including a magnetic hub connector, wherein the magnetic hub connector of the interchangeable spokes may be configured to mate with a magnetic spoke hub of a top core portion of the spinning top;
    a stem protruding from the top surface of the planar body, the stem including a base affixed directly to the top surface of the planar body, wherein the base is configured to hold a locking insert in place on the top surface of the planar body; and
    a conical base protruding from the bottom surface of the planar body, the conical base including a base tip;
    wherein the base tip defines a vertical axis of rotation symmetrical about the stem, and further wherein the planar body is in rotation greater than 60 Hz and under AC electric light, the indentations appear as a fast rotating blur.

19. The spinning top of claim 18, wherein the locking inserts include a geometrically shaped hole, and further wherein the geometrically shaped hole is configured to match the sloped portion of the stem such that the locking insert locks in place on the top surface of the planar body.

* * * * *